United States Patent [19]

Viertel et al.

[11] 4,205,873
[45] Jun. 3, 1980

[54] SUN VISOR MOTION CONTROL APPARATUS

[75] Inventors: Lothar Viertel, Wuppertal; Gert Mahler, Radevormwald, both of Fed. Rep. of Germany

[73] Assignee: Gebr. Happich GmbH, Wuppertal, Fed. Rep. of Germany

[21] Appl. No.: 904,759

[22] Filed: May 11, 1978

[30] Foreign Application Priority Data

May 28, 1977 [DE] Fed. Rep. of Germany ....... 2724414

[51] Int. Cl.² ............................................. B60J 3/02
[52] U.S. Cl. ............................ 296/97 G; 160/DIG. 3
[58] Field of Search ............... 296/97 R, 97 C, 97 G, 296/97 H, 97 K; 160/DIG. 3, DIG. 4

[56] References Cited

U.S. PATENT DOCUMENTS

| 1,837,546 | 12/1931 | Hartzell | 296/97 J |
| 1,880,024 | 9/1932 | Rinker | 296/97 J |
| 3,369,838 | 2/1968 | Nelson | 296/97 G |

Primary Examiner—Richard A. Bertsch
Attorney, Agent, or Firm—Ostrolenk, Faber, Gerb & Soffen

[57] ABSTRACT

A vehicle sun visor body has its rear edge pivotally supported in a slide slot running generally along the roof of the vehicle, a strap is pivotally connected to the visor body forward of the rear thereof and is also pivotally connected at the vehicle roof, whereby as the rear of the visor body moves toward the windshield, the front moves down along the windshield.

24 Claims, 9 Drawing Figures

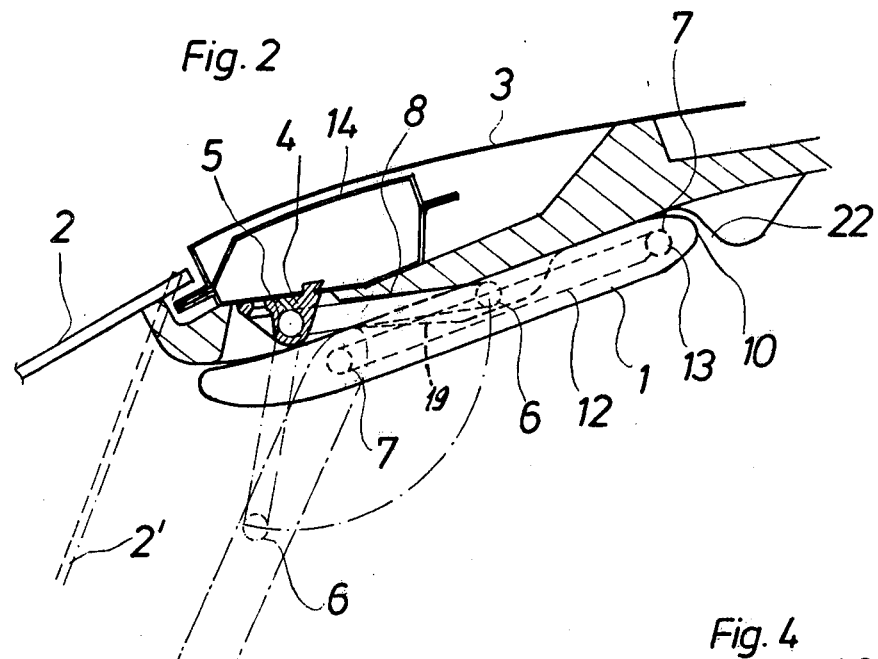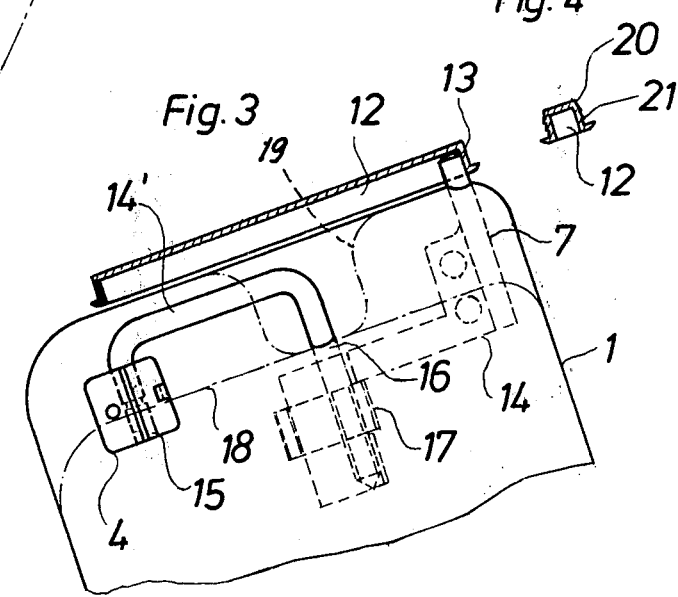

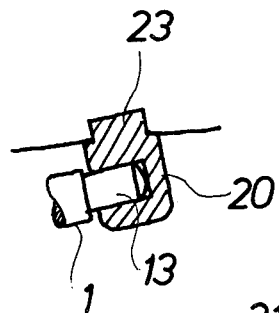
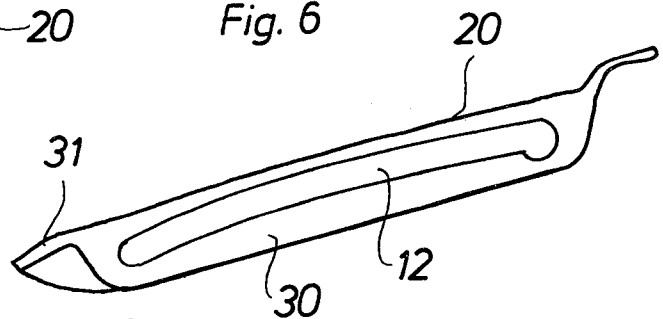
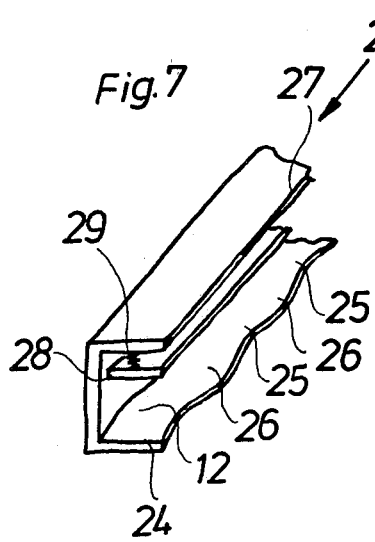
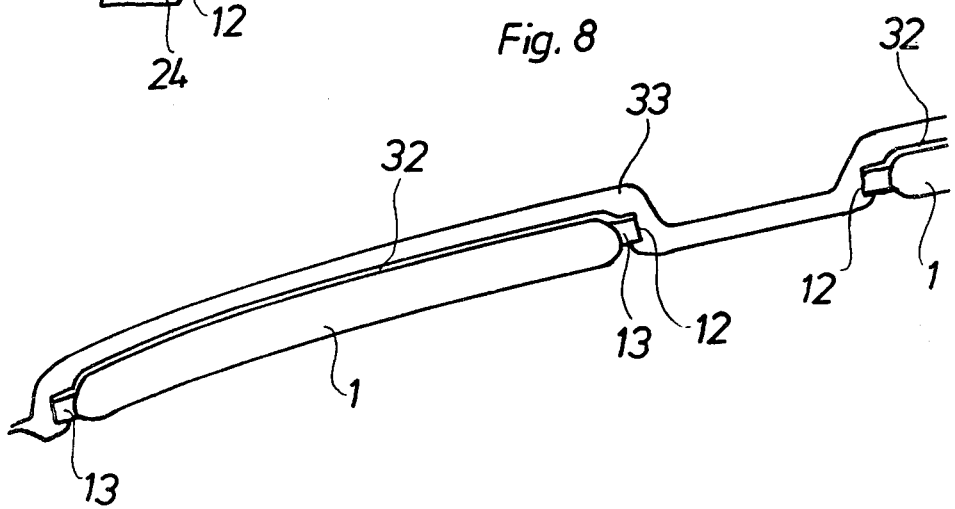

SUN VISOR MOTION CONTROL APPARATUS

BACKGROUND OF THE INVENTION

The invention relates to a sun visor for a motor vehicle, and particularly to means for moving the sun visor between an inoperative and an operative position.

A conventional sun visor has a main supporting swivel bearing located at one end area of its upper longitudinal edge. In some sun visors there also may be a counter-bearing located at the other end area of the upper edge of the visor.

Customarily, a passenger in a vehicle will place a sun visor into use by gripping it at the free longitudinal edge opposite the bearing and flipping it downwards into place, generally covering an upper portion of the windshield. Thus the sun visor, in the process of being flipped downward, is caused to travel through an arc of up to 180 degrees or more. The free longitudinal edge first travels in an arcuate path into the interior of the vehicle and then along the same arc toward the windshield, as needed.

In many intermediate positions the free edge of the sun visor body is oriented directly opposite the vehicle occupants, which can be hazardous. In the event of a collision, the head of a passenger may be thrown directly into that free edge and serious head injuries may result, notwithstanding any padding on the sun visor. There are further problems resulting from the necessity of moving the sun visor body in that arcuate path first toward the passenger and only then toward the windshield. To begin with, the sun visor body must traverse an arc of 90 degrees or more before it reaches a position affording any glare protection. An intense sudden glare, occurring for example, when a vehicle is making a turn or while it is following a curve in the road, may require an instant response. The lapse of several seconds required for the occupant to reach for the sun visor and to turn it through its normal circular arc and to adjust it into position may cause the driver to suffer temporary blindness. If the driver is forced to look away from the road because of the sudden glare, it may prove hazardous, particularly in the midst of fast-moving two-way traffic.

Another disadvantage of the swivelable sun visor occurs in some sports cars because the relatively low height of the car affords less head room. When the free edge of the sun visor body is moved through its circular arc toward the driver, he must duck or turn sideways, causing him to momentarily take his eyes off the road.

In another sun visor design, shown in German Patent Specification 947,049, parallel guides with paths in planes perpendicular to the visor body, are provided so that the visor can be swung downward from a non-use position along the roof above the windshield to a use position along the upper part of that windshield. That sun visor must also be moved relatively far into the vehicle interior during the swivel motion, resulting in the already mentioned hazards, particularly when space inside the vehicle is minimal. Furthermore, the problem is compounded as the length of the guides is increased. But if the guides are kept short, glare protection is decreased and may be inadequate. Moreover, in the process of pivoting such guides, a relatively wide gap can form between the roof and the visor body.

In the case of a curved sun visor for vehicles with curved windshields, the visor is made to conform to the curvature of the windshield and to move in accordance with that curvature. See, for example, German Patent Specification 904,743. The long front and rear edges of the sun visor body are both moved obliquely downward along the same path of motion in the direction toward the windshield. Although that sun visor overcomes the problems occurring when a sun visor is moved into the passenger compartment, its application is limited to curved windshields and it must be made to conform to the particular curvature of the windshield with which it is to be used.

SUMMARY OF THE INVENTION

It is a primary object of the invention to provide a sun visor that can be moved from a non-use position to a use position with traveling in a circular arc toward the passenger.

It is another object of the invention to provide the foregoing sun visor such that it can be rapidly placed in use.

It is a further object of the invention to provide the foregoing sun visor in a standardized shape which is independent of the curvature or angle of inclination of any particular windshield.

It is another object of the invention to provide a sun visor capable of standardized design and manufacture which is transferred from a non-use to a use position by moving the rear side of the sun visor forward simultaneously causing the front side facing the windshield to move downward.

It is a further object of the invention to provide a sun visor useful against sudden bursts of glare, which visor can be rapidly moved into position with a simple tug, thereby diminishing both the hazard of a circular motion involving the movement of the free long edge of the visor toward the head of the passenger and the time lost in that movement.

It is an additional object of this invention to provide a sun visor which lends itself to use in low vehicles such as sport cars where head room may be cramped.

It is a still further object of the invention to provide a sun visor whereby the free long edge can be moved downward first in a straight line and then in a curve in the direction of the windshield.

According to the invention, the foregoing objects are accomplished by a sun visor body that moves forward toward the windshield and downward at the same time. Due to such simplified motion, the sun visor body is transferred from its non-use position to its use position and vice versa without the need for an inward circular flipping motion applied to conventional sun visors. With the downward motion of the sun visor body front edge, there is immediate glare protection because there is no idling motion as in the case of a flip-down motion. The forward motion of the sun visor body rear edge precludes the orientation of a long edge of the sun visor body towards the vehicle driver, thereby considerably reducing the danger of injury therefrom in a head-on collision. In particular, the invention offers the advantage that the sun visor body is not being moved in interfering manner in the direction toward the vehicle driver into the vehicle interior, which is of particular importance when vehicles of low-slung design with restricted interior space are involved.

Due to the invention, the sun visor body front edge can be moved downward in a straight line and its rear edge forward in a straight line. The sun visor body front edge can also be moved downward in a straight line and its rear edge forward approximately perpendicular thereto. In both cases, the angle of inclination of the sun visor body can be largely adapted to the respective angle of inclination of the windshield by appropriate orientations of the paths of motion.

A special step of the method according to the invention consists in that the sun visor body front edge is moved downward first in a straight line and then in a curve in the direction of the windshield. This measure according to the invention makes possible an adaptation of the sun visor body to windshields having any angles of inclination because the sun visor body can always be brought into a position roughly parallel to the windshield.

The sun visor body according to the invention may be moved in a lever/slide slot guidance system. It preferably is moved by changing the location of two adjacent hinge points of a knee lever system.

In a preferred embodiment of this invention the adjusting device attached to the sun visor body is a knee lever. One lever arm of that knee lever is comprised of the sun visor body itself and the other lever arm is comprised of a strap. One end of the strap is hinged to the sun visor body.

In accordance with the preferred embodiment of this invention there are two spaced apart outer hinge points. One outer hinge point is adjacent to the windshield and is designed as a pivot bearing. One end of the strap is connected at that hinge point. The other end of the strap, as noted above, is connected to the visor body at a pivotable knee joint. The other outer hinge point is located in the area of the rear longitudinal edge of the sun visor body. This other hinge point comprises a slidable bearing. If the user grips the sun visor body along its rear longitudinal edge and moves the slidable outer bearing in the direction forward toward the other pivot bearing for the strap, the front longitudinal edge of the sun visor body is thereby moved downward and while the rear longitudinal edge is moved forward.

Other objects and features of this invention will become apparent from the following description of the accompanying drawings.

BRIEF DESCRIPTION OF THE DRAWINGS

FIG. 2 is a side cross-sectional view of the sun visor.

FIG. 3 is a top view of a fragment of the sun visor shown in FIG. 2.

FIG. 4 is a cross-sectional view of one embodiment of a slideslot housing.

FIG. 5 is a cross-sectional view through a second embodiment of a slide slot housing.

FIG. 6 is a side elevational view of one embodiment of a slide slot housing.

FIG. 7 is a perspective view of another embodiment of a slide slot housing.

FIG. 8 is a side view of a sun visor housing.

DESCRIPTION OF THE PREFERRED EMBODIMENTS

Figure 1:
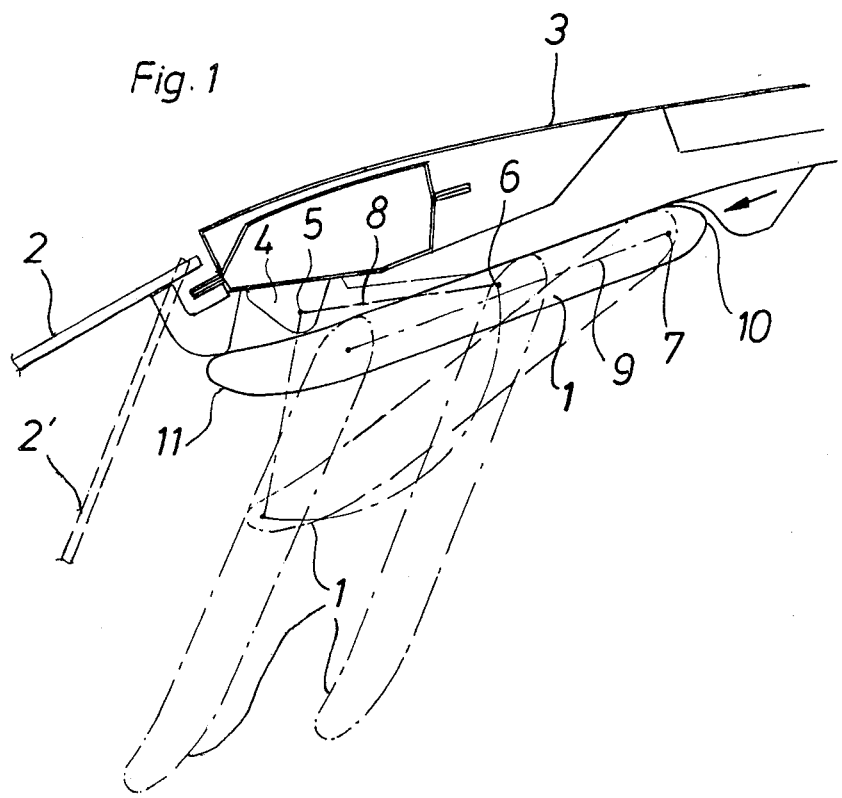
FIG. 1 is a side view of a sun visor according to the invention shown as it would appear when it is disposed in various positions.

The sun visor of the invention is principally intended for use in motor vehicles. As shown in FIG. 1, the visor comprises a sun visor body 1 conventionally formed of a relatively soft padding material such as a foam plastic material. It is shown in solid line in its non-use position located above and behind the windshield 2 and below the vehicle roof 3. The sun visor body 1 may be moved from its non-use position into any of the use positions shown in broken lines in FIG. 1 for affording glare protection. The sun visor body 1 moves about a knee joint 6 located at about the center, from front to rear, of the visor body. The joint 6 is pivotally linked to an outer pivot joint 5 through the rigid connecting strap 8. The other end of strap 8 is pivotally connected to a bearing block 4. Together with a second, outer, slidable joint 7, described further below, the outer pivot joint 5 and central knee joint 6 permit a knee lever action on the visor body 1. The sun visor body 1 is itself one arm of the knee lever and the strap 8 is the second lever arm.

A hinge pin of the outer slidable joint 7 at the rear end of the visor body 1 engages a positive guiding means 9, such as a guide channel supported on block 4, which is oriented approximately parallel to the face of the sun visor body 1 when the knee lever is in the upraised, non-use position. As may be seen from FIG. 1, the distance between the hinge joints 6, 7 and 6, 5 is approximately the same. The sun visor body 1 projects beyond the knee joint 6 in a direction toward the windshield 2 by a distance greater than half the width of the sun visor body 1.

In operation, a force may be exerted in the direction of the arrow shown in FIG. 1 on the longitudinal rear (right in FIG. 1) edge 10 of the sun visor body 1, whereupon the longitudinal front edge 11 swings down immediately due to the knee action of the joints 5 and 6. The specific arrangement and placement of the joints 5, 6 and 7 causes the longitudinal front edge 11 to traverse a considerably longer distance than the rear edge 10. As shown in FIG. 1, the ratio of the distance travelled by the front edge 11 to the rear edge 10 is about 3:1. Therefore, if the rear edge 10 of the sun visor body 1 is pushed forward by about 1 cm., the front edge 11 simultaneously moves downward by about 3 cm. so that effective glare protection is quite rapidly obtained. If the positive guiding means 9 is straight, the front edge 11 of the sun visor body 1 will at first move downward in a straight line. A change in the direction of the front edge 11 takes place only after the bearing joint 7 has travelled forward about half its possible stroke length in the positive guiding means 9. As joint 7 moves from that point forward, bearing joint 7 travels in an arc toward the windshield 2, as depicted by the broken line in FIG. 1. Because of the just described motion of the visor body, effective operation of the visor body is still obtained even with different angles of inclination of the windshield 2 and the windshield 2', indicated by the solid and dash-dotted line relative to the vehicle roof 3 as shown in FIG. 1. Although only several possible positions of the sun visor body 1 are shown in FIG. 1, it is clear, nonetheless, that an unlimited number of positions are possible. It is also apparent that the path of motion of the sun visor body 1 may be modified quite simply by the displacement of one or more of the hinged joints 5, 6 and 7 or by a different orientation of the positive guiding means 9 so that the sun visor body 1 can be used in practically all types of vehicles.

Referring to FIG. 2, the outer, slidable joint 7 comprises a pin 13 that moves with the visor body and that engages a below described slide slot 12. The pin 13 is an integral part of a bearing block 14 disposed on the sun visor body 1, as shown in FIG. 3.

The strap 8, which forms the second lever arm of the knee lever, is shown in FIG. 3 as being comprised of a round U-shaped shaft 14' particularly made from steel. The short leg 15 of the shaft 14' engages the bearing block 4 which is fastened to the roof structure of the vehicle while the long leg 16 of shaft 14' engages the sun visor body 1 or a detent spring 17 disposed in the sun visor body for receiving shaft 14'. In the area of the detent spring 17, the leg 16 has several flats (not shown) so that the sun visor body 1 may be retained in various ones of the slide positions (like those positions of body 1 in FIG. 1) by the detent spring 17. The shaft 14' does not hinder the free mobility of the sun visor body 1 because the latter has on each of its faces a narrowing of its cross section ending about at 18 and formed by a recess 19 and by bevels extending from it to the front and rear longitudinal edges. The leg 15 forms the outer pivot joint 5 and the leg 16 of shaft 14' forms the knee joint 6.

FIG. 4 is a cross section of slide slot 12 formed by the opening of an oblong housing 20 of U-shaped cross section. The side walls of housing 20 have several barb-like teeth 21 extending in the longitudinal direction of the housing. They serve to give the housing a dowel-like design, making it possible to introduce that housing into an appropriate cutout in the vehicle body (not shown). The presence of several teeth 21 provides for ready adaptation to different lining thicknesses. The use of housing 20 presupposes that the sun visor body 1 may be stationed in a recess 22 below the vehicle roof 3 and having recess walls perpendicular to the sun visor body plane in the area of the sun visor body faces.

Where no recess 22 extends, it is expedient to use the alternate embodiment of housing 20, shown in FIG. 5, which has a lug of material on one housing wall. That housing may be provided with through holes for receiving fastening screws that penetrate both housing walls and also the lug of material of the housing wall, whereby the housing 20 may be fastened in the vehicle.

In normal operation, the sun visor body is hinged in knee lever fashion on both its faces and has detent points for various slide positions. As shown in FIGS. 2 and 3, the detent points are formed by the leg 16 on shaft 14' in conjunction with the detent spring 17.

FIG. 6 is an angle section showing a slide housing 20, the slide slot 12 of curved design in this instance being provided in leg 30 while leg 31 serves fastening purposes to the vehicle body.

FIG. 7 depicts an alternative means by which the sun visor body may be hinged. Therein, the lower wall 24 of housing 20 describes sine curves along the longitudinal direction, generating wave crests 25 and wave troughs 26. The distance between the wave crests 25 opposite the inside of the upper wall 27 is designed so that the pin 13 must overcome a certain inhibition every time it moves forward in housing 20 in order to reach the next wave trough 26. On the one hand, the inhibition is strong enough to preclude the sun visor body 1 from shifting by itself. But, on the other hand, it is not strong enough to render manual shifting of the sun visor body particularly difficult. One expedient supplement to the detent arrangement comprises disposing a metal strip 28 inside the slide slot 12. This strip is movable against the force of compression springs 29 in the direction toward the upper walls 27 when the pin 13 moves over the wave crests 25, whereby the shifting strip 28 detents the position of pin 13.

FIG. 8 shows another embodiment of the invention There, two sun visor bodies 1 are accommodated in respective trough-shaped recesses 32 of a bearing housing 33. The significance of the bearing housing is that the bearing blocks 4 and the slide slots 12 are integral parts of the same bearing housing. The bearing housing 33 can be preassembled with sun visor body 1 by the manufacturer and can be installed in a vehicle complete without extra assembly costs.

Figure 9:
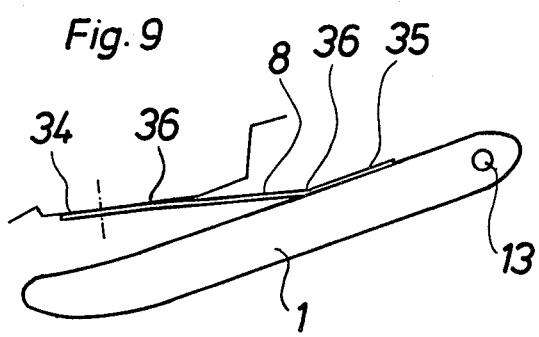
FIG. 9 is a side view of a sun visor body.

FIG. 9 illustrates a still further embodiment of the invention. There the sun visor body 1 has pins 13 which project from its faces and form the joint 7 of the knee lever slidable in a positive guiding means, in particular the slide slot 12. The strap 8 is here designed with an integral bearing lug 34 and an integral fastening lug 35 and the connection between these is being formed by film hinges 36. The bearing lug 34 is fastened to the vehicle roof 3, while the fastening lug 35 is attached to the sun visor body 1.

In a still further variant of the above described arrangements, the slide guiding means may be disposed, for example, so as to extend beneath the vehicle roof and parallel to the surface of the sun visor body 1 facing the vehicle roof and to have a dovetail slide slot engaged by angular or T-shaped pins disposed on the sun visor body 1 in the area of its long rear edge 10.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. Apparatus, comprising:
   (A) a passenger compartment for a vehicle, said passenger compartment including a roof and a windshield;
   (B) a sun visor including:
      (1) a rigid visor body, said visor body having a front and a rear which are spaced apart; and
      (2) an adjusting device attached to said passenger compartment near the top of said windshield; said adjusting device including means for guiding said visor front in a first direction which is more down along the windshield as said visor body rear moves in a second direction which is less down than said first direction and which is substantially parallel to said roof.

2. The apparatus of claim 1, wherein said adjusting device causes said visor body front to move in said first direction down along the windshield in a straight line and causes said visor body rear to move in said second direction toward the windshield in a straight line.

3. The apparatus of claim 2, wherein said adjusting device causes the motions of said visor body front and rear to be substantially perpendicular.

4. The apparatus of claim 1, wherein said adjusting device causes said visor body front to first move down along the windshield in a straight line and then to move in an arc toward the windshield.

5. A sun visor comprising:
   an unbending visor body, said visor body having a front and a rear which are separated apart;
   an adjusting device attached to said visor body and mounted near the top of said windshield; said adjusting device comprising means for causing said visor body front to move in a first direction which is more down along the windshield as said visor body rear moves in a second direction which is less down than the first direction and is more towards the windshield, said adjusting device comprising:

guiding means for guiding said visor body rear to move toward the windshield; said visor body having a first pivot located rearwardly of said front thereof; said visor body being pivotally attached to said guiding means at said first pivot such that as said visor body moves toward the windshield along said guiding means, and such that said visor body also pivots around said first pivot with respect to said guiding means for causing said visor body front to move down along the windshield.

6. The sun visor of claim 5, wherein said adjusting device further comprises a strap pivotally mounted to said visor body at a second pivot thereon spaced from said first pivot; said strap being supported on the vehicle for providing support to the pivoting said visor body.

7. The sun visor of claim 6, wherein said visor body front is spaced away from said second pivot, and said strap being supported on said vehicle at a location closer to said visor body front than is said second pivot when said visor body front has not yet been moved downward.

8. The sun visor of claim 6, wherein said second pivot is nearer to said visor body front than said first pivot.

9. The sun visor of claim 6, wherein said adjusting device further comprises a bearing supported on the vehicle for supporting said strap; said strap being pivotally connected to said bearing at a location along said strap remote from said second visor body pivot.

10. The sun visor of claim 9, wherein said strap comprises a generally U-shaped shaft having a first leg which is pivotally attached to said visor body at said second visor body pivot and having another leg which is pivotally attached to said bearing.

11. The sun visor of claim 10, further comprising a detent spring embedded in said visor body; said shaft first leg engages said detent spring.

12. The sun visor of claim 6, wherein said guiding means comprises a slide means attached to the vehicle body, said visor body first pivot comprises means on said visor body for slidably engaging said slide means for sliding therealong as said visor body pivots about said first pivot.

13. The sun visor of claim 12, wherein said slide means includes a slot and said means on said visor body at said first pivot includes a projection extending from said visor body into said slide means slot.

14. The sun visor of claim 13, wherein with said sun visor body rear moved away from the windshield and said visor body projection moved rearwardly on said slide means slot, said strap forms an acute angle with said slide means slot at both said bearing and said second pivot.

15. The sun visor of claim 12, wherein the distance between said first and second pivots is approximately the length of said strap between said bearing and said visor body second pivot.

16. The sun visor of claims 12 or 15, wherein the length of said slide means slot approximates the distance between said first and said second pivots.

17. The sun visor of claim 13, wherein said visor body has side edges between said front and said rear thereof and said projection extends from a said side edge of said visor body; said slide means being along said side edge of said visor body.

18. The sun visor of claim 13, wherein said slide means slot is periodically constricted throughout its length thereby to impede the movement of said projection through said slide means slot.

19. The sun visor of claim 18, wherein said slide means slot is defined by two opposite slide means slot walls; one of said walls being shaped generally in the form of a sine curve extending from said opposite slide means slot wall.

20. The sun visor of claim 19, further comprising means for biasing said slide means slot walls toward each other.

21. The sun visor of claim 9, wherein said bearing for said strap is part of a housing and said slide means is also part of said housing; said housing having a recess such that said visor body, when in non-use position, is approximately flush to said bearing in said housing.

22. The sun visor of any one of claims 9, 12 or 21, wherein said guiding means and said bearing are attached at the roof of a vehicle at the windshield thereof.

23. A device for transferring a sun visor from a position of non-use, at which the sun visor is generally upraised, to a position of use, at which the sun visor is down in an operative position, comprising:
a sun visor comprising an unbending visor body; said visor body having a front and having a rear part, which are spaced apart;
said transferring device being connected to said visor body and being mounted above a windshield inside a vehicle; said transferring device comprising:
a slide path connected to said visor body rear part; said slide path extending generally toward said visor body front from said visor body rear part, when said visor body front is in an upraised position and said visor body rear part is rearward of said visor body front;
a front guide element connected with said visor body for transferring said visor body front downwardly toward the position of sun visor use as said visor body rear part moves forwardly in said slide path to the position of sun visor use.

24. The device for transferring a sun visor of claim 23, wherein said front guide element extends between said visor body, at a location spaced closer to said visor body front than the connection between said visor body and said slide path, and a vehicle in which said transferring device is located.

* * * * *